United States Patent
Wang

(10) Patent No.: US 10,208,865 B2
(45) Date of Patent: Feb. 19, 2019

(54) AIR VALVE CONNECTING DEVICE

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

(*) Notice: Subject to any disclaimer, the term of this patent is extended or adjusted under 35 U.S.C. 154(b) by 234 days.

(21) Appl. No.: 15/408,595

(22) Filed: Jan. 18, 2017

(65) Prior Publication Data

US 2018/0202564 A1    Jul. 19, 2018

(51) Int. Cl.
*F16K 15/20* (2006.01)
*B60C 29/00* (2006.01)

(52) U.S. Cl.
CPC .............. *F16K 15/20* (2013.01); *B60C 29/00* (2013.01); *B60C 29/005* (2013.01)

(58) Field of Classification Search
CPC ........ F16K 15/20; B60C 29/00; B60C 29/005
USPC ............................................ 137/223; 141/38
See application file for complete search history.

(56) References Cited

U.S. PATENT DOCUMENTS

| | | | |
|---|---|---|---|
| 5,960,815 A | 10/1999 | Wang | |
| 6,105,600 A | 8/2000 | Wang | |
| 6,105,601 A | 8/2000 | Wang | |
| 6,260,572 B1 * | 7/2001 | Wu | F04B 33/005 137/223 |
| 6,279,599 B1 * | 8/2001 | Chen | F04B 33/005 137/228 |
| 6,328,057 B1 | 12/2001 | Wang | |
| 6,978,796 B2 * | 12/2005 | Ostrowiecki | F16K 17/0413 137/223 |
| 7,032,612 B2 * | 4/2006 | Shipman | F16K 15/20 137/231 |
| 7,073,545 B2 * | 7/2006 | Smith | B60P 7/065 137/228 |
| 7,320,347 B2 * | 1/2008 | Ramsey | B60P 7/065 137/228 |
| 7,866,335 B2 | 1/2011 | Wang | |
| 8,539,971 B2 | 9/2013 | Wang | |
| 2017/0225528 A1 * | 8/2017 | Cheng | B29C 73/166 |

* cited by examiner

*Primary Examiner* — Timothy L Maust
(74) *Attorney, Agent, or Firm* — Charles E. Baxley

(57) ABSTRACT

An air valve connecting device includes a housing, a shank slidably engaged in the housing and limited to slide relative to the housing, and prevented from pivoting and rotating relative to the housing, the shank includes one end portion for receiving the pressurized air, a barrel is rotatably engaged with the shank and connected to the housing for detachably securing the inflation valve to the barrel, and a control ferrule is connected to the housing and moved in concert with the housing and the barrel relative to the shank, and the control ferrule is threaded with the shank for forcing and moving the shank toward and to engage with the inflation valve when the control ferrule is rotated relative to the shank.

10 Claims, 7 Drawing Sheets

AIR VALVE CONNECTING DEVICE

BACKGROUND OF THE INVENTION

1. Field of the Invention

The present invention relates to an air valve connecting head or device, and more particularly to an air valve connecting device including a simplified or improved structure for easily connecting to various inflation valves and for being easily actuated or operated with a single hand of the user and for being easily manufactured with a decreased manufacturing procedure and cost.

2. Description of the Prior Art

Various kinds of typical air valve connecting devices have been developed and comprise a valve housing including one end for connecting or coupling to a pressurized air reservoir and for receiving the pressurized air from the pressurized air reservoir, and a fitting port formed in the other end of the valve housing for receiving or engaging with an inflation valve and for inflating the balls, the inner tires of the bicycles or the motorcycles or the vehicles, the present inventor has developed various kinds of air valve connecting devices.

For example, U.S. Pat. No. 5,960,815 to Wang, U.S. Pat. No. 6,105,600 to Wang, U.S. Pat. No. 6,105,601 to Wang, U.S. Pat. No. 6,328,057 to Wang, U.S. Pat. No. 7,866,335 to Wang, and U.S. Pat. No. 8,539,971 to Wang disclose several of the typical air valve connecting heads for a hand-held air pump and also comprising a valve housing including one end for connecting or coupling to a pressurized air reservoir, and including a fitting port formed in an elastic annular block for engaging with an inflation valve.

However, normally, the typical air valve connecting heads required to be provided with an actuating handle or hand grip to be grasped or held or operated with one hand of the user, and the user has to use the other hand to grasp and actuate or operate the valve housing, such that the typical air valve connecting heads comprise a structure that may not be easily operated or may not effectively grasping or holding the different inflation valves and may comprise a greatly increased manufacturing cost and manufacturing procedures.

The present invention has arisen to mitigate and/or obviate the afore-described disadvantages of the conventional air valve connecting devices.

SUMMARY OF THE INVENTION

The primary objective of the present invention is to provide an air valve connecting device including a simplified or improved structure for easily connecting to various inflation valves and for being easily actuated or operated with a single hand of the user and for being easily manufactured with a decreased manufacturing procedure and cost.

In accordance with one aspect of the invention, there is provided an air valve connecting device comprising a housing including a chamber formed therein, and including a first end portion, a shank slidably engaged in the chamber of the housing and limited to slide relative to the housing, and prevented from pivoting and rotating relative to the housing, the shank including a bore formed therein for receiving a pressurized air, and the shank including a first end portion for receiving the pressurized air, and the shank including a second end portion, a barrel rotatably engaged with the shank and rotatably connected to the housing, and the barrel including an inner thread formed therein for engaging with an inflation valve and for detachably securing the inflation valve to the barrel, and a control ferrule rotatably engaged with the shank and rotatably connected to the housing, the control ferrule being slid and moved in concert with the housing and the barrel relative to the shank, and the control ferrule being threaded and engaged with the shank for forcing and moving the control ferrule and the housing and the barrel relative to the shank and for forcing and moving the second end portion of the shank toward and to engage with the inflation valve when the control ferrule is rotated relative to the shank and for allowing the inflation valve to be easily and quickly supplied and filled with the pressurized air.

The shank includes an outer thread formed thereon, and the control ferrule includes an inner thread formed therein for engaging with the outer thread of the shank and for forcing and moving the control ferrule and the housing and the barrel and the inflation valve relative to the shank longitudinally when the control ferrule is rotated relative to the shank and thus for allowing the second end portion of the shank to be easily and quickly and effectively forced and moved toward and to engage with the inflation valve with the control ferrule.

The first end portion of the shank is connected to a hose for receiving the pressurized air from the hose or from a pressurized air reservoir. A shield may further be provided and engaged onto the hose and the first end portion of the shank for clamping and securing the hose to the shank and for preventing the hose from being disengaged from the shank.

The housing includes a non-circular segment formed therein, and the shank includes a non-circular portion slidably engaged with the non-circular segment of the housing for guiding the shank to slide relative to the housing and for preventing the shank from being rotated relative to the housing. The shank includes a mouth provided in the second end portion thereof for selectively engaging with the inflation valve and for being selectively forced and moved toward and to engage with the inflation valve when the control ferrule is rotated relative to the shank.

The barrel includes a gasket engaged into the barrel for softly and resiliently engaging with the inflation valve and for making an air or water tight seal between the barrel and the inflation valve. An anchor may further be provided and attached to the housing and engaged with the barrel for guiding and limiting the barrel to rotate relative to the housing and for preventing the barrel from moving longitudinally relative to the housing.

The barrel includes a peripheral recess formed therein, and the anchor includes a projection extended therefrom and engaged into the chamber of the housing and engaged with the peripheral recess of the barrel for guiding and limiting the barrel to rotate relative to the housing and for preventing the barrel from moving longitudinally relative to the housing. The control ferrule includes a peripheral depression formed therein, and the anchor includes a projection extended therefrom and engaged into the chamber of the housing and engaged with the peripheral depression of the control ferrule for guiding and limiting the control ferrule to rotate relative to the housing and for preventing the control ferrule from moving longitudinally relative to the housing.

Further objectives and advantages of the present invention will become apparent from a careful reading of the detailed

DETAILED DESCRIPTION OF THE PREFERRED EMBODIMENT

Figure 1:
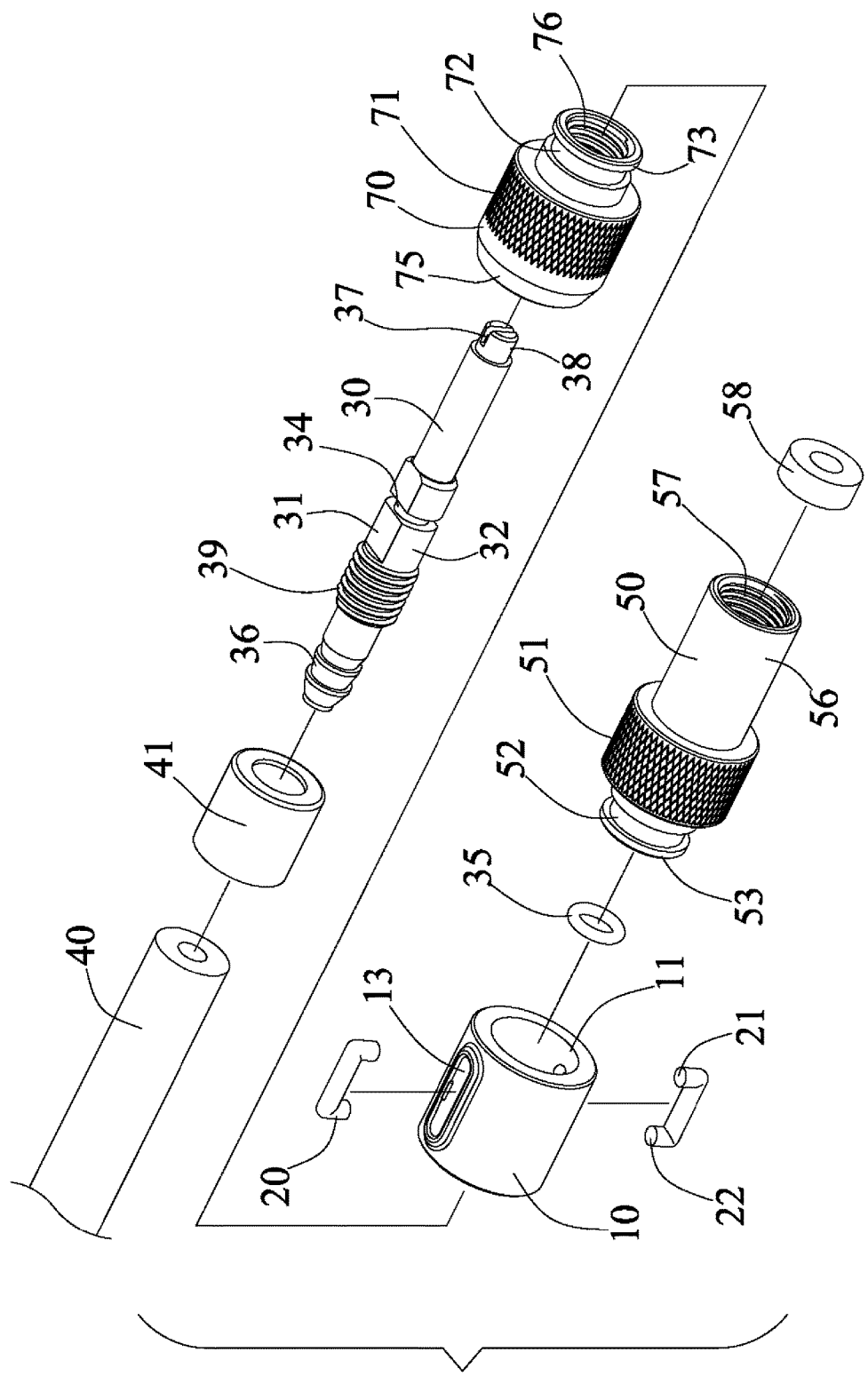
FIG. 1 is a partial exploded view of an air valve connecting device in accordance with the present invention.
Figure 2:
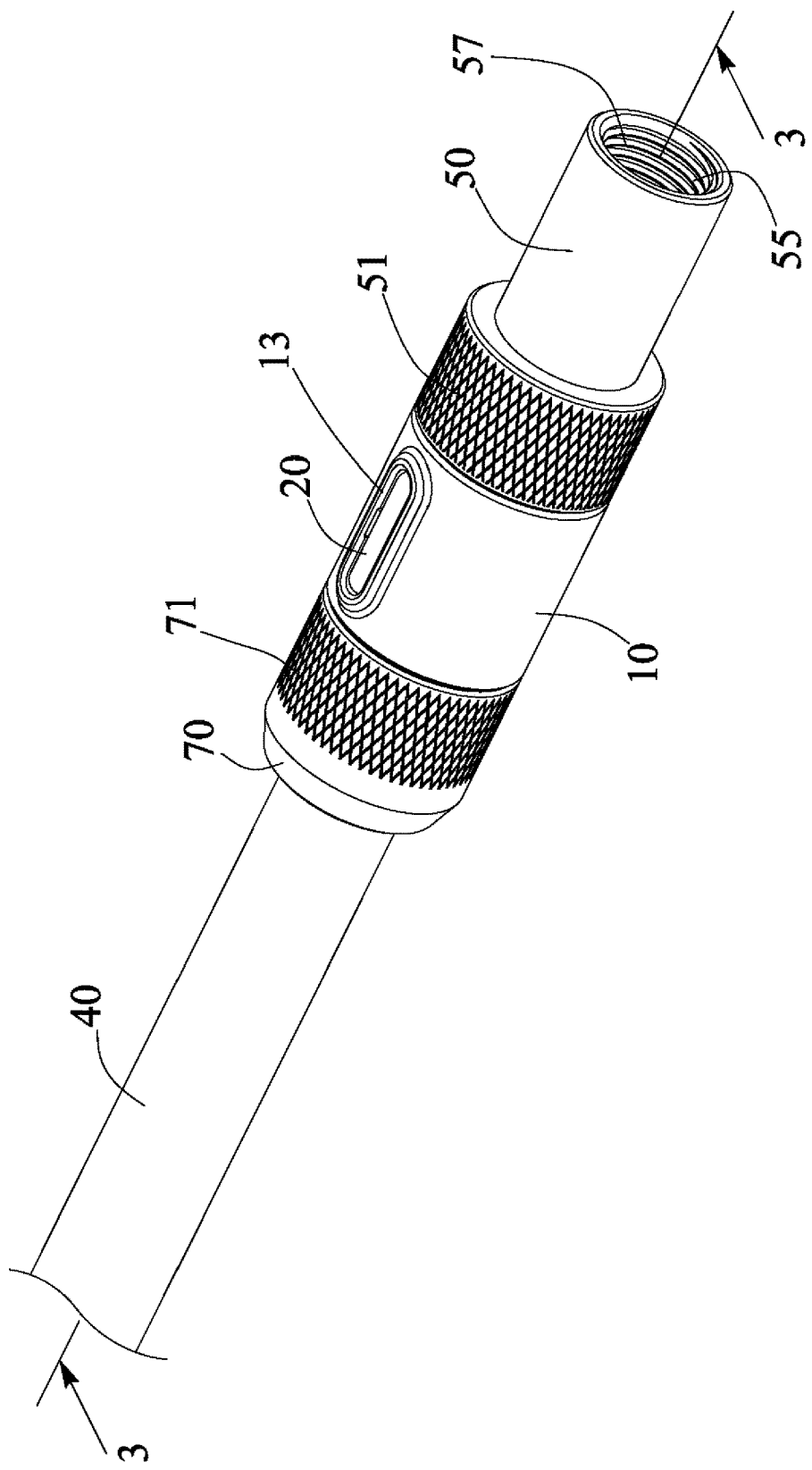
FIG. 2 is a perspective view of the air valve connecting device.
Figure 3:
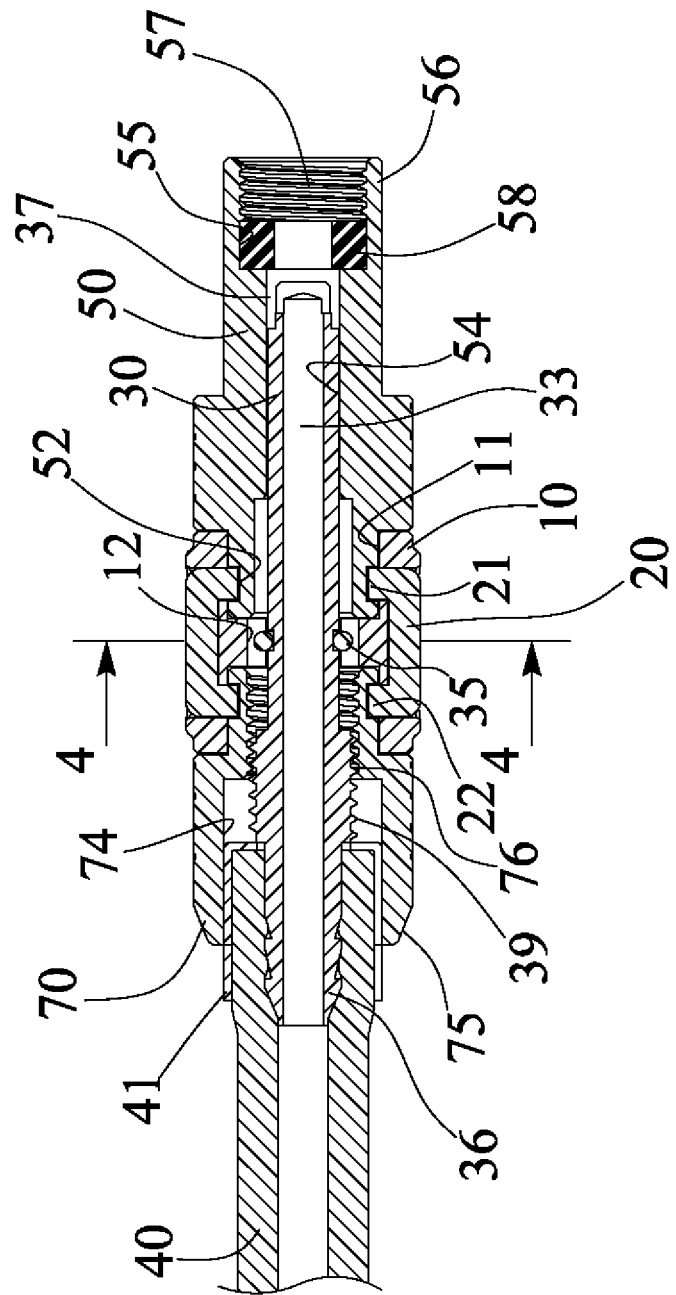
FIG. 3 is cross sectional view of the air valve connecting device, taken along lines 3-3 of FIG. 2.
Figure 4:
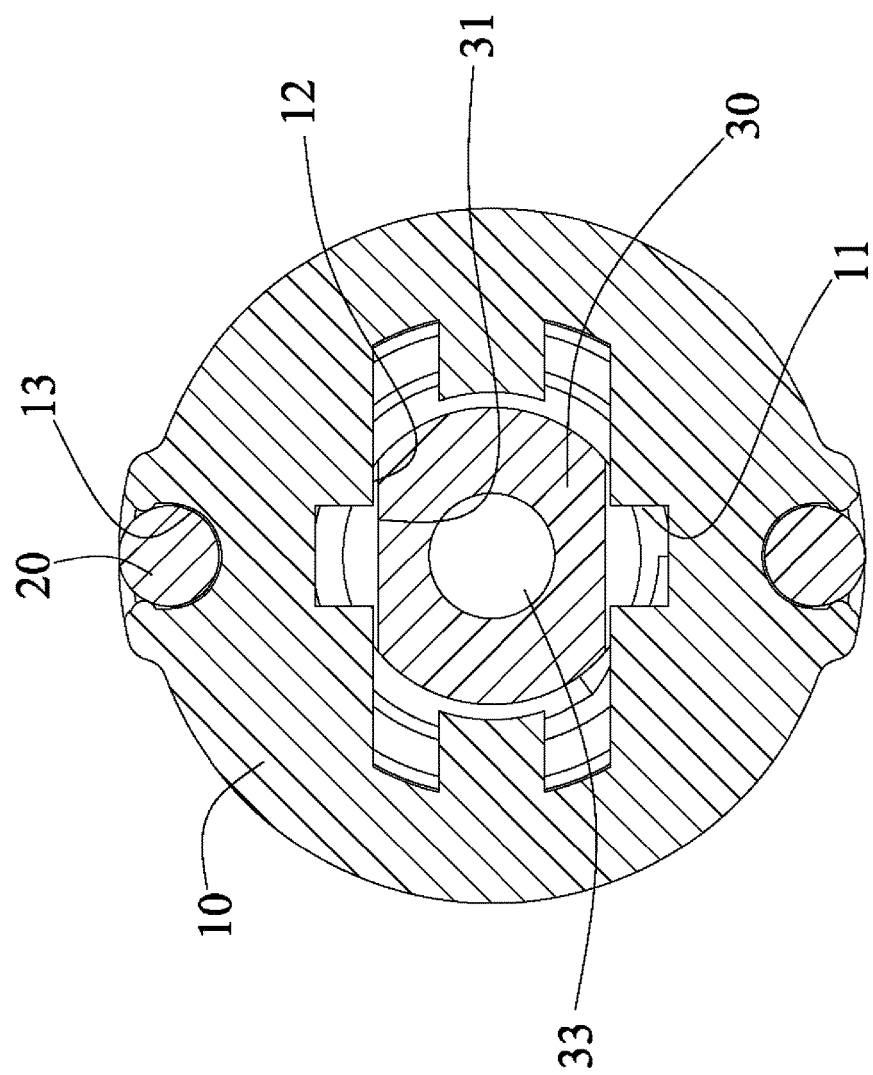
FIG. 4 is cross sectional view of the air valve connecting device, taken along lines 4-4 of FIG. 3.

Referring to the drawings, and initially to FIGS. 1-4, an air valve connecting device in accordance with the present invention comprises a valve connecting body or housing 10 including a bore or chamber 11 formed therein, and including a non-circular portion or space or segment 12 formed or provided therein (FIGS. 3, 4), and including one or more (such as two) channels 13 oppositely formed therein and/or equally spaced from each other and partially intersecting or communicating with the chamber 11 of the housing 10 and each for receiving or engaging with a latch or anchor 20 therein. For example, the anchors 20 are attached to or engaged into the channels 13 of the housing 10 respectively and each anchor 20 include one or more (such as two) legs or projections 21, 22 extended therefrom and engaged into the chamber 11 of the housing 10, best shown in FIG. 3.

A mandrel or shank 30 is slidably received or engaged in the chamber 11 of the housing 10, and includes a non-circular area or portion 31 formed or provided in the middle or intermediate portion 32 thereof and slidably engaged with the corresponding non-circular segment 12 of the housing 10 for guiding and limiting the shank 30 to slide relative to the housing 10 and for preventing the shank 30 from being pivoted or rotated relative to the housing 10. The shank 30 includes a compartment or bore 33 formed therein (FIGS. 3, 4), and it is preferable that the shank 30 includes an annular or peripheral groove 34 formed therein for engaging with a gasket or sealing ring 35 which is also engaged with the housing 10 for making an air or water tight seal between the housing 10 and the shank 30.

The shank 30 includes one or first end portion 36 connected or coupled to a pipe or hose 40 which is connected or coupled to an air pump (not illustrated), a pressurized air reservoir or the like, for receiving the pressurized air therefrom and for allowing the pressurized air to flow into the bore 33 of the shank 30. A clamp or shield 41 may further be provided and attached or engaged onto the hose 40 and the first end portion 36 of the shank 30 for solidly and stably and tightly clamping and securing or coupling the hose 40 to the shank 30 and for preventing the hose 40 from being disengaged or separated from the shank 30. The shank 30 further includes a slit or mouth 37 formed or provided in the other or second end portion 38 thereof, and includes an outer thread 39 formed or provided on the middle or intermediate portion 32 thereof.

A cylindrical tube or barrel 50 is pivotally or rotatably engaged with or onto the second end portion 38 of the shank 30, and includes an embossed or knurled or serrated portion 51 formed or provided thereon for being grasped or held by the user and for suitably and effectively pivoting or rotating the barrel 50 relative to the shank 30, and includes an annular or peripheral recess 52 formed or provided in the one or first end portion 53 thereof for slidably receiving or engaging with one of the projections 21 of the anchors 20 and for slidably connecting or coupling the barrel 50 to the housing 10, and for guiding and limiting the barrel 50 to pivot or rotate relative to the housing 10 and for preventing the barrel 50 from being slid or moved longitudinally or axially relative to the housing 10.

The barrel 50 also includes a compartment or bore 54 formed therein (FIG. 3) for slidably receiving or engaging with the second end portion 38 of the shank 30 and for receiving the pressurized air from the mouth 37 and the bore 33 of the shank 30, and includes an enlarged opening or space 55 formed or provided in the other or second end portion 56 thereof and communicating with the bore 54 of the barrel 50, and includes a screw hole or an inner thread 57 formed in the space 55 at the second end portion 56 of the barrel 50 for threading or engaging with an inflation valve 90, such as a U.S. type valve, a French type valve, or the other inflation valves or the like, and for detachably or releasably attaching or securing the inflation valve 90 to the barrel 50. A cylindrical gasket 58 which is made of soft or resilient materials, such as rubber, plastic, composite materials, or other synthetic materials, is engaged into the space 55 of the barrel 50 for resiliently engaging with the inflation valve 90 and for making an air or water tight seal between the barrel 50 and the inflation valve 90.

Another barrel or control ferrule 70 is further provided and pivotally or rotatably engaged with or onto the first end portion 36 of the shank 30 and/or the shield 41 and/or the hose 40, and includes an embossed or knurled or serrated portion 71 formed or provided thereon for being grasped or held by the user and for suitably and effectively pivoting or rotating the control ferrule 70 relative to the shank 30, and includes an annular or peripheral depression 72 formed or provided in the one or first end portion 73 thereof for slidably receiving or engaging with the other projection 22 of the anchor 20 and for slidably connecting or coupling the control ferrule 70 to the housing 10, and for guiding and limiting the control ferrule 70 to pivot or rotate relative to the housing 10 and for preventing the control ferrule 70 from being slid or moved longitudinally or axially relative to the housing 10, and for allowing the control ferrule 70 and the housing 10 and the barrel 50 to be slid and moved in concert with each other relative to the shank 30.

Figure 7:
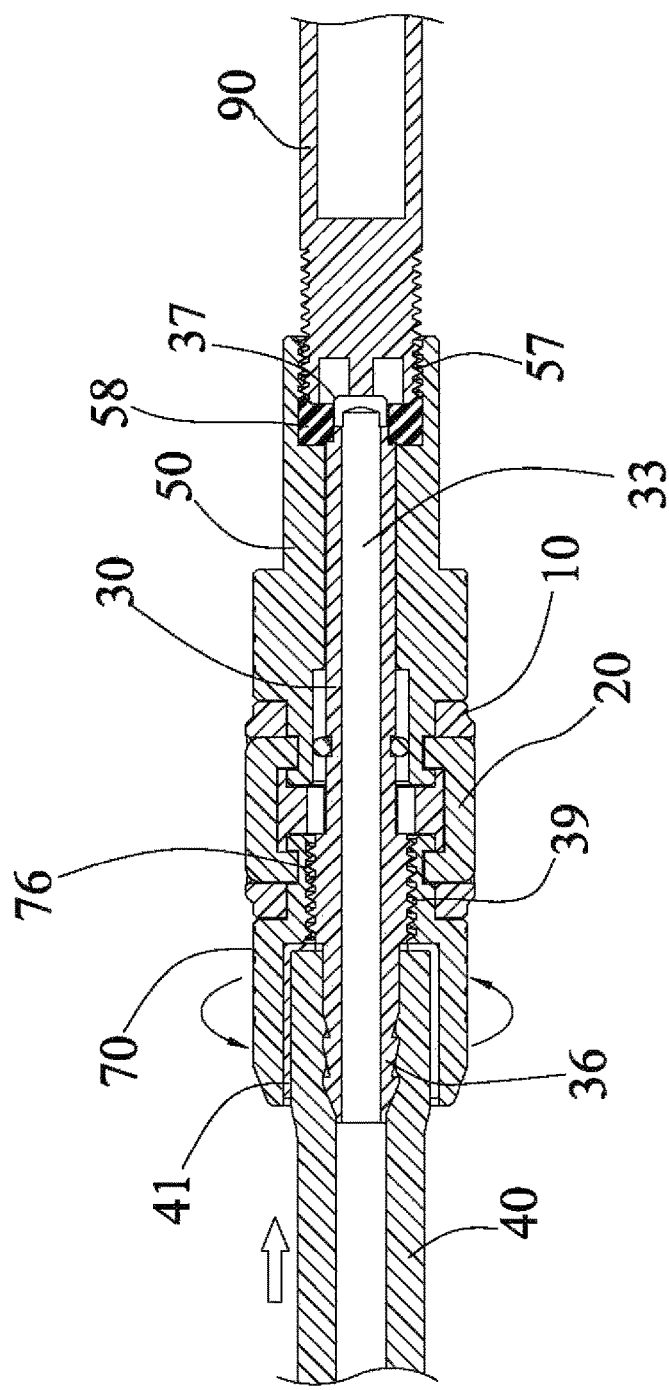

The control ferrule 70 includes a chamber or compartment 74 formed therein (FIG. 3), such as formed or provided in the other or second end portion 75 thereof for slidably receiving or engaging with the shield 41 and/or the hose 40, and includes a screw hole or an inner thread 76 formed in the first end portion 73 of the control ferrule 70 for threading or engaging with the outer thread 39 of the shank 30 and for selectively forcing and moving the control ferrule 70 and the housing 10 and the barrel 50 and thus the inflation valve 90 relative to the shank 30 longitudinally, and thus for selectively forcing and moving the mouth 37 of the shank 30 toward and/or to contact or engage with the inflation valve 90 when the control ferrule 70 is pivoted or rotated relative to the shank 30, best shown in FIG. 7.

Figure 5:
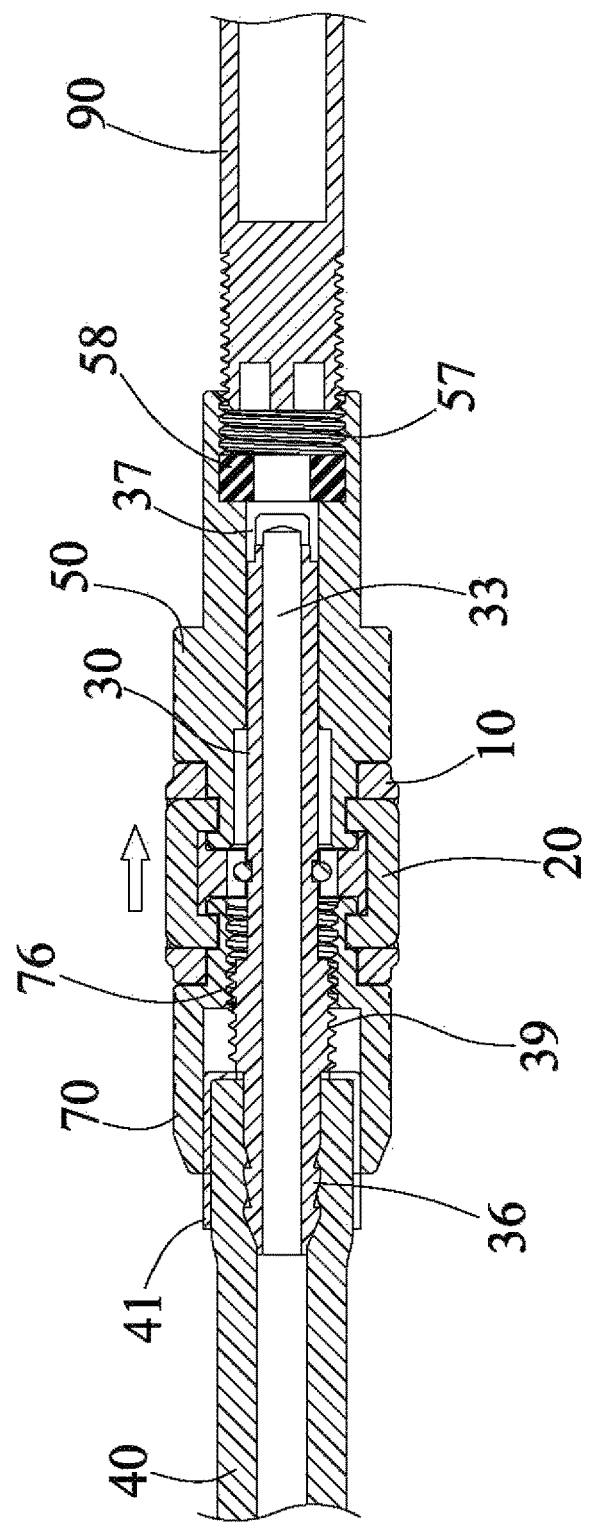
FIGS. 5, 6, 7 are cross sectional views similar to FIG. 3, illustrating the operation of the air valve connecting device for engaging with the inflation valve.
Figure 6:
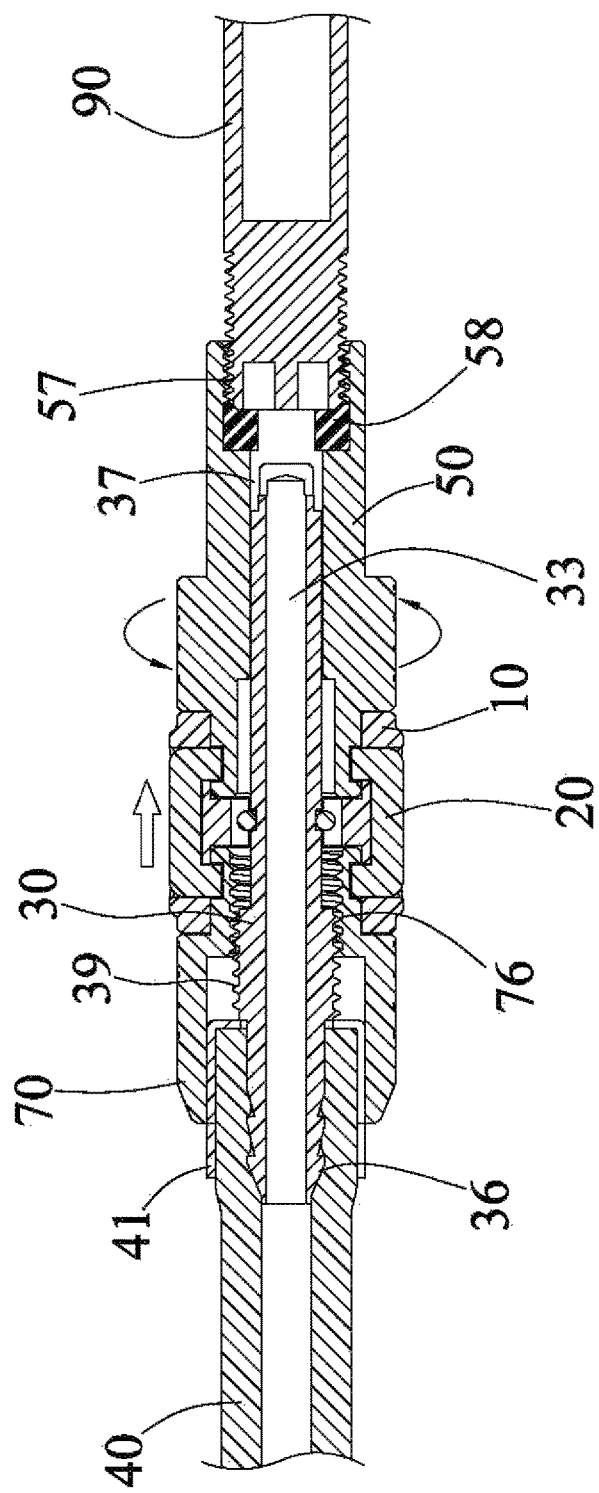

In operation, as shown in FIG. 5, when the inflation valve 90 is required to be supplied and filled with a pressurized air, the inflation valve 90 may first be moved toward the second end portion 56 of the barrel 50, and the barrel 50 may then be pivoted or rotated relative to the housing 10 and the shank 30 for threading or engaging the inner thread 57 of the barrel 50 with the inflation valve 90, best shown in FIG. 6, and for selectively forcing and moving the inflation valve 90 to contact or engage with the resilient and/or cylindrical gasket 58. As shown in FIG. 7, the control ferrule 70 may then be pivoted or rotated relative to the housing 10 and the shank 30 for selectively forcing and moving the mouth 37 of the shank 30 toward and/or to contact or engage with the inflation valve 90 and for allowing the pressurized air to be suitably and effectively supplied and filled into the inflation valve 90.

The air valve connecting device in accordance with the present invention may thus be easily and quickly engaged with the inflation valve 90 with a single hand of the user, and the mouth 37 of the shank 30 may also be easily and quickly forced and moved to engage with the inflation valve 90 with a single hand of the user.

Accordingly, the air valve connecting device in accordance with the present invention includes a simplified and improved structure for easily connecting to various inflation valves and for being easily actuated or operated with a single hand of the user and for being easily manufactured with a decreased manufacturing procedure and cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a chamber formed therein, and including a first end portion,
   a shank slidably engaged in said chamber of said housing and limited to slide relative to said housing, and prevented from pivoting and rotating relative to said housing, said shank including a bore formed therein for receiving a pressurized air, and said shank including a first end portion for receiving the pressurized air, and said shank including a second end portion,
   a barrel rotatably engaged with said shank and rotatably connected to said housing, and said barrel including an inner thread formed therein for engaging with an inflation valve and for detachably securing said inflation valve to said barrel, and
   a control ferrule rotatably engaged with said shank and rotatably connected to said housing, said control ferrule being slid and moved in concert with said housing and said barrel relative to said shank, and said control ferrule being threaded and engaged with said shank for forcing and moving said control ferrule and said housing and said barrel relative to said shank and for forcing and moving said second end portion of said shank toward and to engage with the inflation valve when said control ferrule is rotated relative to said shank.

2. The air valve connecting device as claimed in claim 1, wherein said shank includes an outer thread formed thereon, and said control ferrule includes an inner thread formed therein for engaging with said outer thread of said shank and for forcing and moving said control ferrule and said housing and said barrel and said inflation valve relative to said shank longitudinally when said control ferrule is rotated relative to said shank.

3. The air valve connecting device as claimed in claim 1, wherein said first end portion of said shank is connected to a hose for receiving the pressurized air from said hose.

4. The air valve connecting device as claimed in claim 3, wherein a shield is engaged onto said hose and said first end portion of said shank for clamping and securing said hose to said shank and for preventing said hose from being disengaged from said shank.

5. The air valve connecting device as claimed in claim 1, wherein said housing includes a non-circular segment formed therein, and said shank includes a non-circular portion slidably engaged with said non-circular segment of said housing for guiding said shank to slide relative to said housing and for preventing said shank from being rotated relative to said housing.

6. The air valve connecting device as claimed in claim 1, wherein said shank includes a mouth provided in said second end portion thereof for selectively engaging with said inflation valve.

7. The air valve connecting device as claimed in claim 1, wherein an anchor is attached to said housing and engaged with said barrel for guiding and limiting said barrel to rotate relative to said housing and for preventing said barrel from moving longitudinally relative to said housing.

8. The air valve connecting device as claimed in claim 7, wherein said barrel includes a peripheral recess formed therein, and said anchor includes a projection extended therefrom and engaged into said chamber of said housing and engaged with said peripheral recess of said barrel for guiding and limiting said barrel to rotate relative to said housing.

9. The air valve connecting device as claimed in claim 7, wherein said control ferrule includes a peripheral depression formed therein, and said anchor includes a projection extended therefrom and engaged into said chamber of said housing and engaged with said peripheral depression of said control ferrule for guiding and limiting said control ferrule to rotate relative to said housing.

10. The air valve connecting device as claimed in claim 1, wherein said barrel includes a gasket engaged into said barrel for engaging with said inflation valve.

* * * * *